United States Patent
Kurishige et al.

(10) Patent No.: US 6,459,971 B1
(45) Date of Patent: Oct. 1, 2002

(54) ELECTRIC POWER STEERING CONTROL SYSTEM AND METHOD FOR CONTROLLING THE ELECTRIC POWER STEERING CONTROL SYSTEM

(75) Inventors: Masahiko Kurishige; Noriyuki Inoue; Ryoji Nishiyama; Kazumichi Tsutsumi; Takayuki Kifuku, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/931,853

(22) Filed: Aug. 20, 2001

(30) Foreign Application Priority Data

Aug. 30, 2000 (JP) ........................................ 2000-261758

(51) Int. Cl.[7] .............................. B62D 6/00; G06F 7/00
(52) U.S. Cl. .............................. 701/41; 701/43; 701/80; 180/6.2; 180/443; 180/446
(58) Field of Search .............................. 701/41, 43, 80; 180/6.2, 6.24, 400, 443, 446, 447

(56) References Cited

U.S. PATENT DOCUMENTS 6,032,756 A * 3/2000 Nishimura et al. ......... 180/446
6,244,373 B1 * 6/2001 Kojo et al. .................. 180/443

* cited by examiner

Primary Examiner—Yonel Beaulieu
(74) Attorney, Agent, or Firm—Leydig, Voit & Mayer, Ltd.

(57) ABSTRACT

In an electric power steering control system, a road surface reaction torque estimator estimates a road surface reaction torque on the basis of steering wheel angle. A neutral point learning unit and a neutral point compensator learn a neutral point of the steering wheel on the basis of the road surface reaction torque with respect to the steering wheel angle. A return torque for returning the steering wheel to the neutral point is computed from a difference between a current angle of the motor and the learned neutral point. As a result, the steering wheel returns to the neutral point under the current driving condition without application of any force to the steering wheel by the driver.

18 Claims, 11 Drawing Sheets

| VEHICLE SPEED | LOW SPEED | HIGH SPEED |
|---|---|---|
| DIRECTION OF STEERING TORQUE AND DIRECTION OF MOTOR ROTATION | SAME | NOT SAME |
| CONTROL | OPERATING STEERING TORQUE CONTROLLER WHILE STOPPING DAMPING COMPENSATOR AND INERTIA COMPENSATOR | STOPPING STEERING TORQUE CONTROLLER WHILE OPERATING DAMPING COMPENSATOR AND INERTIA COMPENSATOR |

( PRIOR ART )

Fig. 11

ELECTRIC POWER STEERING CONTROL SYSTEM AND METHOD FOR CONTROLLING THE ELECTRIC POWER STEERING CONTROL SYSTEM

BACKGROUND OF THE INVENTION

1. Technical Field

The present invention relates to a control system of an electric power steering apparatus for vehicles in which an electric motor generates a torque for assisting a steering torque generated through manipulation of a steering wheel by a driver and to a method for controlling the system.

2. Background Art

Figure 9:
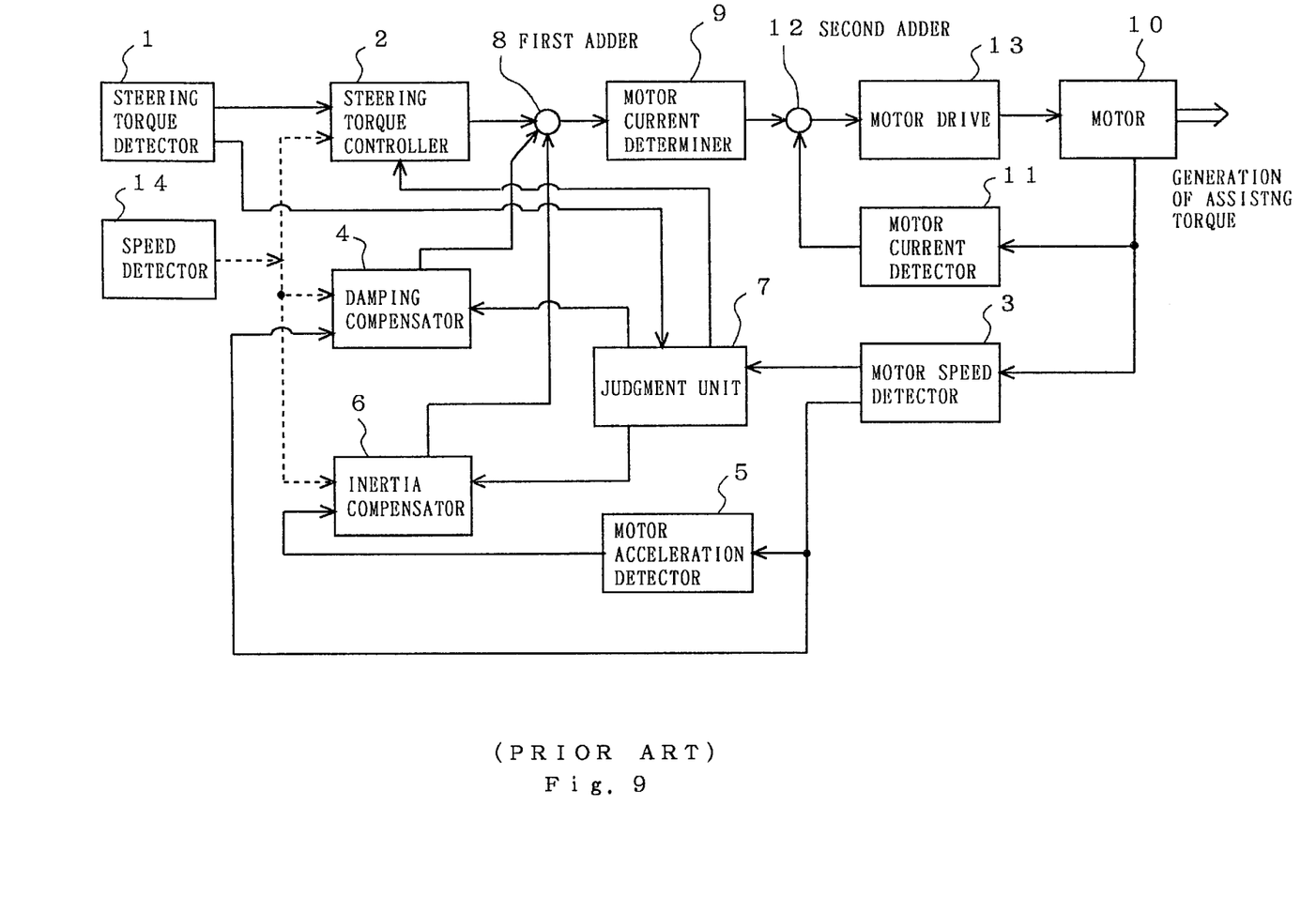
FIG. 9 is a block diagram showing a construction of a electric power steering control system according to the prior art.

FIG. 9 is a block diagram showing a construction of a conventional electric power steering control system similar to, for example, a system described in the Japanese Patent Publication (unexamined) No. 186994/1995.

In the drawing, reference numeral 1 is a steering torque detector for detecting a steering torque generated in a steering wheel when a driver manipulates the steering wheel. Numeral 2 is a steering torque controller for computing an assisting (auxiliary) torque and outputting an assisting torque signal on the basis of an output of the steering torque detector 1. Numeral 3 is a motor speed detector for detecting a motor speed. Numeral 4 is a damping compensator for computing a damping compensation signal on the basis of the motor speed detected by the motor speed detector 3. Numeral 5 is a motor acceleration detector for detecting a motor acceleration using an output of the motor speed detector 3. Numeral 6 is an inertia compensator for computing an inertia compensation signal on the basis of the motor acceleration detected by the motor acceleration detector 5.

Numeral 7 is a judgment (determination) unit for judging whether or not the direction of the output of the steering torque detector 1 and that of the output of the motor speed detector 3 are the same. The result of judgment is outputted to each of the steering torque controller 2, the damping compensator 4, and the inertia compensator 6.

Numeral 8 is a first adder for computing a sum (i.e., this sum is a target torque) of the assisting torque signal, the damping compensation signal, and the inertia compensation signal. Numeral 9 is a motor current determiner for computing a target current signal from the target torque computed by the first adder 8. Numeral 10 is a motor in which a motor current value corresponding to an applied voltage is generated. By this motor 10, an assisting torque that is approximately in proportion to the motor current value is generated, and a steering mechanism not shown is driven. Numeral 11 is a motor current detector for detecting a current value of the motor 10. Numeral 12 is a second adder for obtaining a difference between the target current signal outputted by the motor current determiner 9 and the motor current value detected by the motor current detector 11. Numeral 13 is a motor drive for determining a voltage to be applied to the motor 10 on the basis of the difference between the target current signal computed by the motor current determiner 9 and the motor current value detected by the motor current detector 11. The motor drive 13 applies the determined voltage to the motor 10. Numeral 14 is a speed detector for detecting a speed of the vehicle and outputting the detected speed signal to the steering torque controller 2, the damping compensator 4, and the inertia compensator 6, respectively.

Described below is operation of the conventional electric power steering control system of above construction.

When a driver of a vehicle manipulates a steering wheel not shown, the steering torque detector 1 and outputted to the steering torque controller 2 measures a steering torque applied to the steering wheel. The steering torque controller 2 computes the assisting torque signal that is approximately in proportion to the output signal of the steering torque detector 1. Accordingly, the motor 10 is driven and an assisting torque is generated on the basis of the assisting torque signal, and a steering torque of the driver is assisted to reduce the steering torque that the driver feels.

At this time, the judgment unit 7 judges whether or not the direction of the output of the steering torque detector 1 and the direction of the output of the motor speed detector 3 are the same. If they are judged the same, the damping compensator 4 and the inertia compensator 6 do not work, but only the steering torque controller 2 works. The steering torque controller 2 determines an assisting torque signal according to the output of the steering torque detector 1 and the speed signal from the speed detector 14. A target torque is determined on the basis of the determined assisting torque signal, and the motor current determiner 9 determines a motor drive current.

In the case that the direction of the output of the steering torque detector 1 and the direction of the output of the motor speed detector 3 are not the same, the steering torque controller 2 does not work, but the damping compensator 4 and the inertia compensator 6 work. In this case, the target torque is determined on the basis of the outputs of the damping compensator 4 and the inertia compensator 6, and the motor current determiner 9 determines the motor drive current.

The direction of the target torque is arranged to be the same as that of rotation of the motor when the vehicle is driven at a low speed. The direction is arranged to be opposite to that of rotation of the motor when the vehicle is driven at a high speed. Therefore, when the driver is turning (steering) the steering wheel, the steering torque of the driver is assisted so as to reduce the torque necessary for the steering manipulation. When the driver is returning the steering wheel, the motor 10 is controlled so as to assist the steering wheel to return to the starting point if the vehicle is driven at a low speed and prevents the steering wheel from returning at an excessive speed of rotation if the vehicle is driven at a high speed.

Figure 10:
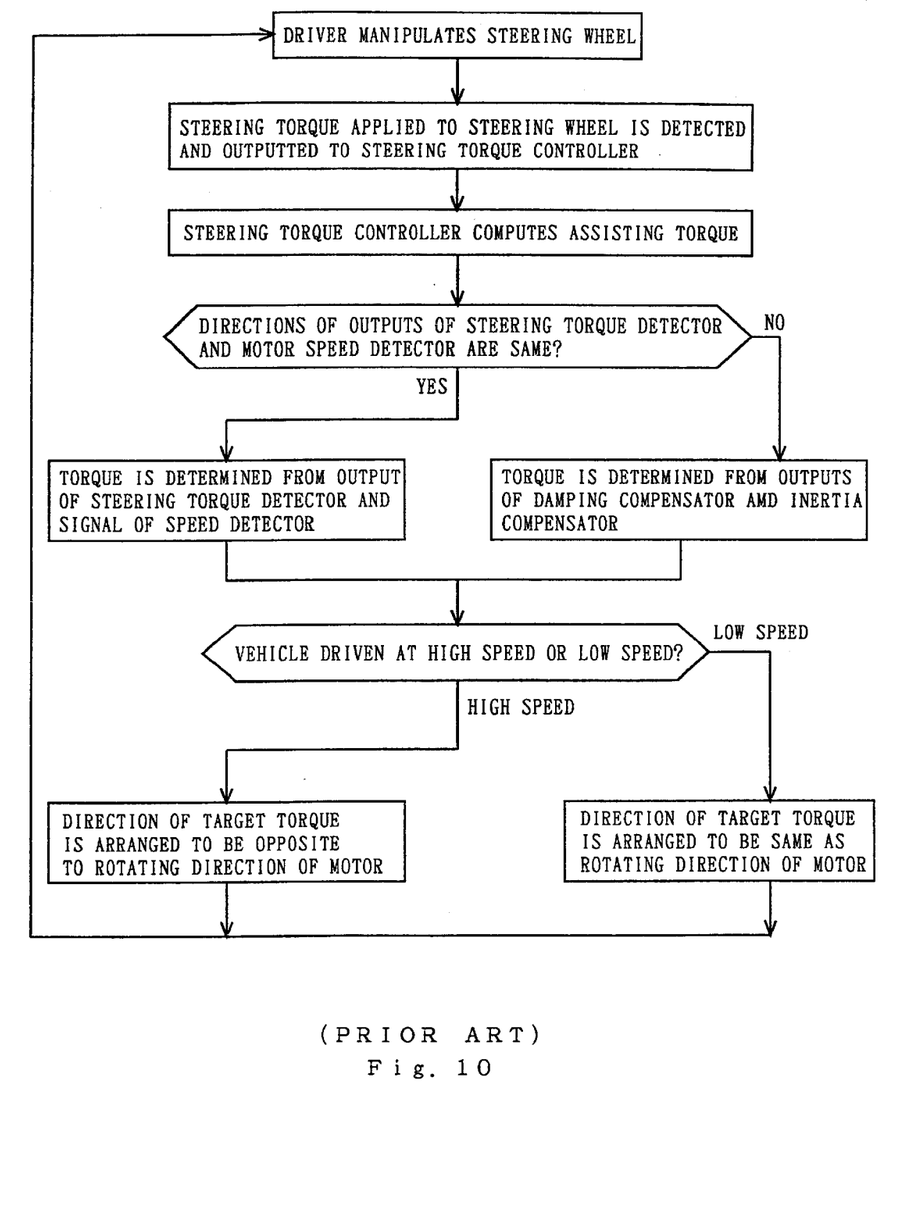
FIG. 10 is a flowchart explaining operation of the electric power steering control system in FIG. 9.
Figure 11:
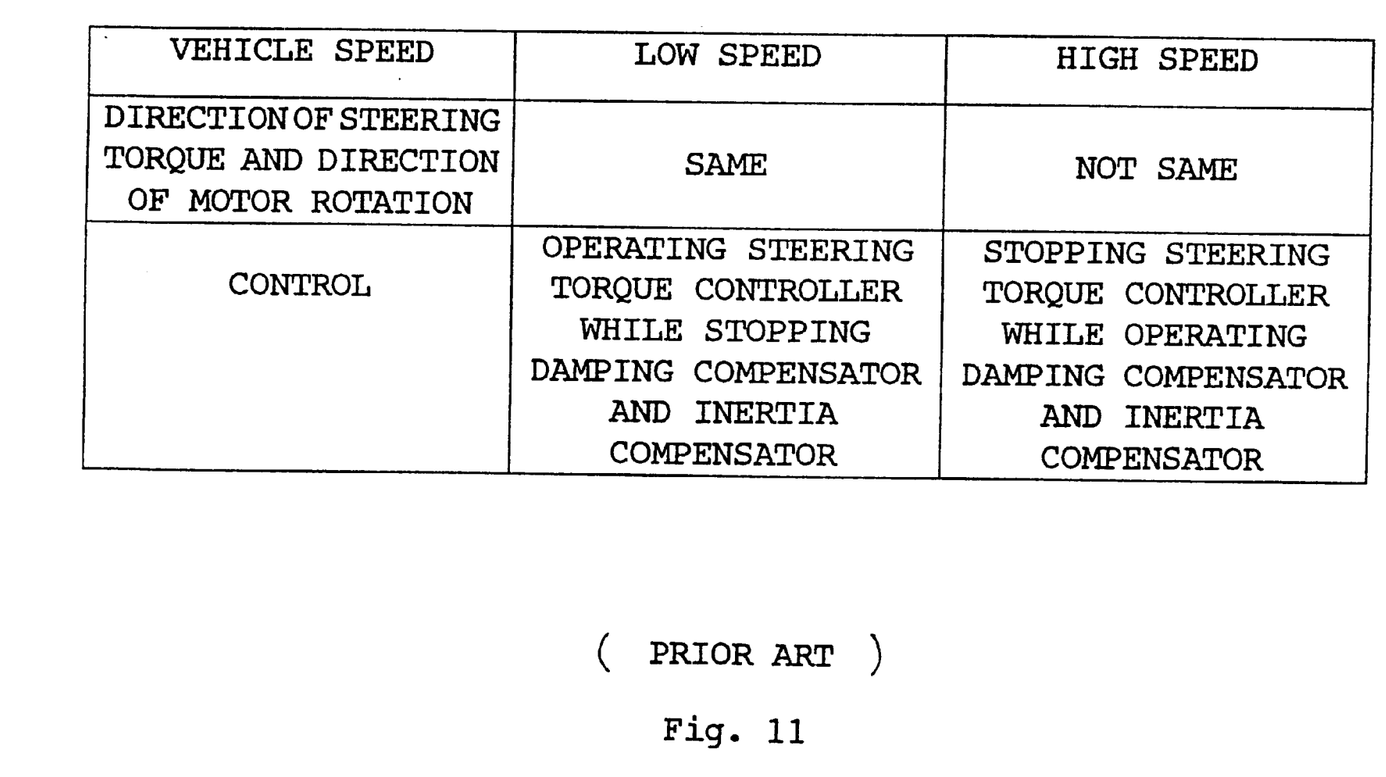
FIG. 11 is a characteristic diagram showing the operation of the electric power steering control system in FIG. 9.

The foregoing flow is shown in FIG. 10. The flow shown in this drawing is hereinafter referred to as main routine. For better understanding, FIG. 11 shows the relation between the directions of the steering torque caused by increase and decrease in speed of the vehicle and of the motor speed.

In general, the driver turns the steering wheel when the vehicle goes round a curve or an intersection. Then the driver returns the steering wheel utilizing a spontaneous returning force of the steering wheel due to road surface reaction torque of tires when the vehicle goes back to a straight running after going round the curve or the intersection. However, when the vehicle is driven at a low speed or when the vehicle is driven at a high speed but the steering wheel is steered a little, the road surface reaction torque of the tires is weak. Consequently, the road surface reaction torque is smaller than friction torque in the steering mechanism, and in many cases the steering wheel does not return when the vehicle goes back to the straight running. To cope with this problem, in the prior art shown in FIGS. 9 to 11, whether or not the output of the steering torque detector 1 and that of the motor speed detector 3 are the same is judged when the vehicle is driven at a low speed. If the outputs are not the same, the motor drive current is established so as to rotate the motor 10 in the same direction as the motor rotation, thereby the returning property of the steering wheel in driving at a low speed is improved. However, in most cases, it is necessary for the driver to add a torque to the steering wheel in order to return the steering wheel, which results in a phenomenon that steering sense or feeling is deteriorated.

In the prior art, when the steering wheel is manipulated within a range where the road surface reaction torque of the tires is small such as going round a curve at a low speed or going round a gentle curve at a high speed, the steering wheel stops and the motor 10 will not rotate unless the driver applies a certain torque in the direction of returning the steering wheel. That is, in this case, it is not possible for the judgment unit 7 to judge whether or not the direction of the output of the steering torque detector 1 and that of the output of the motor speed detector 3 are the same. Therefore it is not possible for the steering torque controller to establish the torque (motor driving current) so as to rotate the motor in the same direction as that of the motor rotation. Consequently, a problem exists in that returning property of the steering wheel is not improved because any electric current does not flow in the motor.

SUMMARY OF THE INVENTION

The present invention was made to resolve the above-discussed problems and has an object of obtaining an electric power steering apparatus capable of returning a steering wheel without application of a torque in returning direction of the steering wheel when the steering wheel is manipulated within a range wherein road surface reaction torque of tires is small such as a case of going round a curve at a low speed or a case of going round a gentle curve at a high speed, controlling returning property of the steering wheel by using a target steering angle (the target steering angle is 0° when the driver wants to return the steering wheel to the original point) corresponding to the will of the driver, thereby improving the returning property of the steering wheel in any driving condition and improving convergence and damping performance after unhanding the steering wheel by using the steering angle. The invention also provides a method for controlling the electric power steering apparatus.

An electric power steering control system according to the invention comprises:

a motor for applying an assisting torque to a steering wheel used for manipulating running wheels of a vehicle;

steering torque detecting means for detecting a torque applied to the steering wheel by a driver as a steering torque;

motor angle detecting means for detecting a rotating angle of the motor;

road surface reaction torque estimating means for estimating a road surface reaction torque of the running wheels using the steering torque;

neutral point learning means for learning a neutral point of the steering wheel under the actual driving condition from the estimated road surface reaction torque and the rotating angle of the motor; and steering angle compensation means for computing a return torque to return the steering wheel to the neutral point from a difference between the rotating angle of the motor and the learned neutral point and for converting the return torque into an electric current of the motor, whereby the return torque is applied to the steering wheel whenever the steering wheel is turned from the neutral point.

Another electric power steering control system according to the invention comprises:

a motor for applying an assisting torque to a steering wheel used for manipulating running wheels of a vehicle;

steering torque detecting means for detecting a torque applied to the steering wheel by a driver as a steering torque;

motor angle detecting means for detecting a rotating angle of the motor;

motor current setting means for setting a target value of an electric current flowing in the motor by receiving a torque command signal;

motor current detecting means for detecting a value of the electric current flowing in the motor;

road surface reaction torque estimating means for estimating a road surface reaction torque of the running wheels using the steering torque and the current of the motor;

neutral point learning means for learning a neutral point of the steering wheel under the current driving condition from the estimated road surface reaction torque and the rotating angle of the motor; and steering angle compensation means for computing a return torque to return the steering wheel to the neutral point from a difference between the rotating angle of the motor and the learned neutral point and outputting the return torque to the motor current setting means, whereby the return torque is applied to the steering wheel whenever the steering wheel is turned from the neutral point.

It is preferable that the electric power steering control system is provided with:

speed detecting means for detecting speed of the vehicle; and means for stopping operation of the neutral point learning means when the vehicle speed detected by the speed detecting means is smaller than a predetermined value.

It is also preferable that the electric power steering control system is provided with rotating direction detecting means for outputting different codes according to the rotating direction of the motor, and the neutral point learning means learns a neutral point in left steering and a neutral point in right steering respectively according to the codes outputted by the rotating direction detecting means at the time of learning the neutral point and subsequently learns a neutral point by computing an average of the neutral point in left steering and the neutral point in right steering.

It is also preferable that the electric power steering control system is provided with rotating direction detecting means for outputting different codes according to the rotating direction of the motor, and the neutral point learning means learns a neutral point on the basis of a value obtained by subtracting or adding a preliminarily stored friction torque of a steering mechanism according to the rotating direction from or to the estimated road surface reaction torque.

It is preferable that the electric power steering control system is provided with rotating speed detecting means for detecting a rotating speed of the motor or angular acceleration detecting means for detecting a rotating angular acceleration of the motor, and the neutral point learning means learns a neutral point when at least one of the rotating speed and the rotating angular acceleration of the motor is smaller than a predetermined value and does not learn the neutral point when the rotating speed or the rotating angular acceleration of the motor is larger than the predetermined value.

It is preferable that the steering angle compensating means is provided with a limiter for limiting an output of the steering angle compensating means to be within a predetermined level.

It is preferable that the electric power steering control system is provided with:

speed detecting means for detecting a vehicle speed;

a damping compensator for compensating a damping on the basis of speed of the motor; and an inertia compensator for compensating an inertia on the basis of acceleration of the motor;

wherein the damping compensator and the inertia compensator work when the vehicle speed exceeds a predetermined level, and the damping compensator and the inertia compensator stop working when the vehicle speed does not exceed the predetermined level.

A method for controlling an electric power steering control system according to the invention includes:

a step of detecting a motor angle in which a rotating angle of a motor for applying an assisting torque to a steering wheel used for manipulating running wheels of a vehicle is detected;

a step of estimating a road surface reaction torque in which a road surface reaction torque is estimated using a steering torque applied to the steering wheel by a driver and a current signal of the motor;

a step of learning a neutral point in which a neutral point of the steering wheel is learned from the road surface reaction torque of the running wheels and the rotating angle of the motor; and a step of compensating a steering angle in which a torque for returning the steering wheel to the neutral point is computed from the neutral point and the rotating angle of the motor.

It is preferable that the method for controlling an electric power steering control system includes:

a step of detecting a vehicle speed; and a step of stopping an operation of the step of learning a neutral point when the vehicle speed is lower than a predetermined value.

It is also preferable that the method for controlling an electric power steering control system includes:

a step of detecting a rotating direction in which different codes are outputted according to the rotating direction of the motor; and a step of learning a neutral point by learning a neutral point in left steering and a neutral point in right steering respectively according to the codes of the rotating direction outputted at the time of learning the neutral point and subsequently computing an average of the neutral point in left steering and the neutral point in right steering.

Since the invention is composed as described above, following advantages are performed.

The rotating angle of the steering wheel is detected using the motor angle in which the neutral point has been corrected on the basis of the signal of estimated road surface reaction torque. As a result, the neutral point of the steering wheel can be grasped without using a steering wheel angle sensor. The steering wheel return torque is generated on the basis of the grasped neutral point of the steering wheel. As a result, in the case that the steering wheel does not return such as going round a gentle curve, the steering wheel spontaneously returns without the driver's returning operation of the steering wheel, and it is possible to construct a power steering control system superior in drive feeling.

The road surface reaction torque is estimated on the basis of the actual electric current detected by the detector. As a result, as compared with the case of using a target electric current, the neutral point of the steering wheel angle is learned more accurately even when there is an offset between the target value and the actual electric current.

It is arranged that the neutral point is not learned when the vehicle is driven at a low speed by using the vehicle speed detecting means. As a result, it is possible to improve accuracy in detecting the neutral point and generate a favorable and appropriate assisting torque of the motor.

The electric power steering control system is provided with the motor angle speed detecting means. The neutral point of the steering angle is learned by learning the neutral point in left steering and that in right steering according to the code of the motor angle speed outputted at the time of learning the neutral point and by computing an average of the neutral point in left steering and that in right steering. As a result, both in left and right steering, friction components of the steering mechanism of approximately the same intensity but in the opposite direction are automatically cancelled. Accuracy in detecting the neutral point is further improved without preliminarily grasping the intensity of friction of the steering mechanism, and as a result it is possible to generate a favorable and appropriate assisting torque of the motor at all times.

The neutral point is learned by subtracting the friction torque in the left and right steering as an offset quantity from the road surface reaction torque estimated by the road surface reaction torque estimating means. As a result, it is possible to further improve accuracy in detecting the neutral point and generate a favorable and appropriate assisting torque of the motor at all times.

The electric power steering control system is constructed so that the neutral point may be learned within the predetermined range of the motor angle speed or within the predetermined range of the motor angle acceleration. Therefore, it is possible to learn the neutral point only under the steering conditions that the neutral point can be learned most accurately, therefore accuracy in detecting the neutral point is not deteriorated. As a result, it is possible to generate a favorable and appropriate assisting torque of the motor at all times.

The electric power steering control system has a construction in which the limiter limits the output for correcting and controlling the fundamental target current. As a result, even if the neutral point of the steering angle is erroneously learned, it is possible to generate an assisting torque with which the driver can easily recover the neutral point, thereby improving safety.

The electric power steering control system is provided with the damping compensator and the inertia compensator, and they are controlled to work or not to work according to the speed of the vehicle. As a result, it is possible to obtain an electric power steering control system superior in drive feeling.

The method for controlling an electric power steering control system according to the invention includes the steps of estimating a road surface reaction torque, learning a neutral point of the steering wheel from the road surface reaction torque, correcting a rotating angle of the motor on the basis of this neutral point, and compensating a steering angle by computing a torque for returning the steering wheel to the neutral point from the rotating angle. As a result, it is possible to generate a torque for returning the steering wheel to the neutral point without using a steering wheel angle sensor and without driver's returning manipulation of the steering wheel.

The step of learning a neutral point is stopped when the speed of the vehicle is lower than the predetermined value. As a result, it is possible to prevent the neutral point from erroneous judging and control the electric power steering control system more accurately.

The neutral point is learned by learning the neutral point in left steering and that in right steering according to the rotating direction of the motor and by using an average of them as the original neutral point. As a result, it is possible to recognize the neutral point more accurately.

DESCRIPTION OF THE PREFERRED EMBODIMENTS

Embodiment 1

Figure 1:
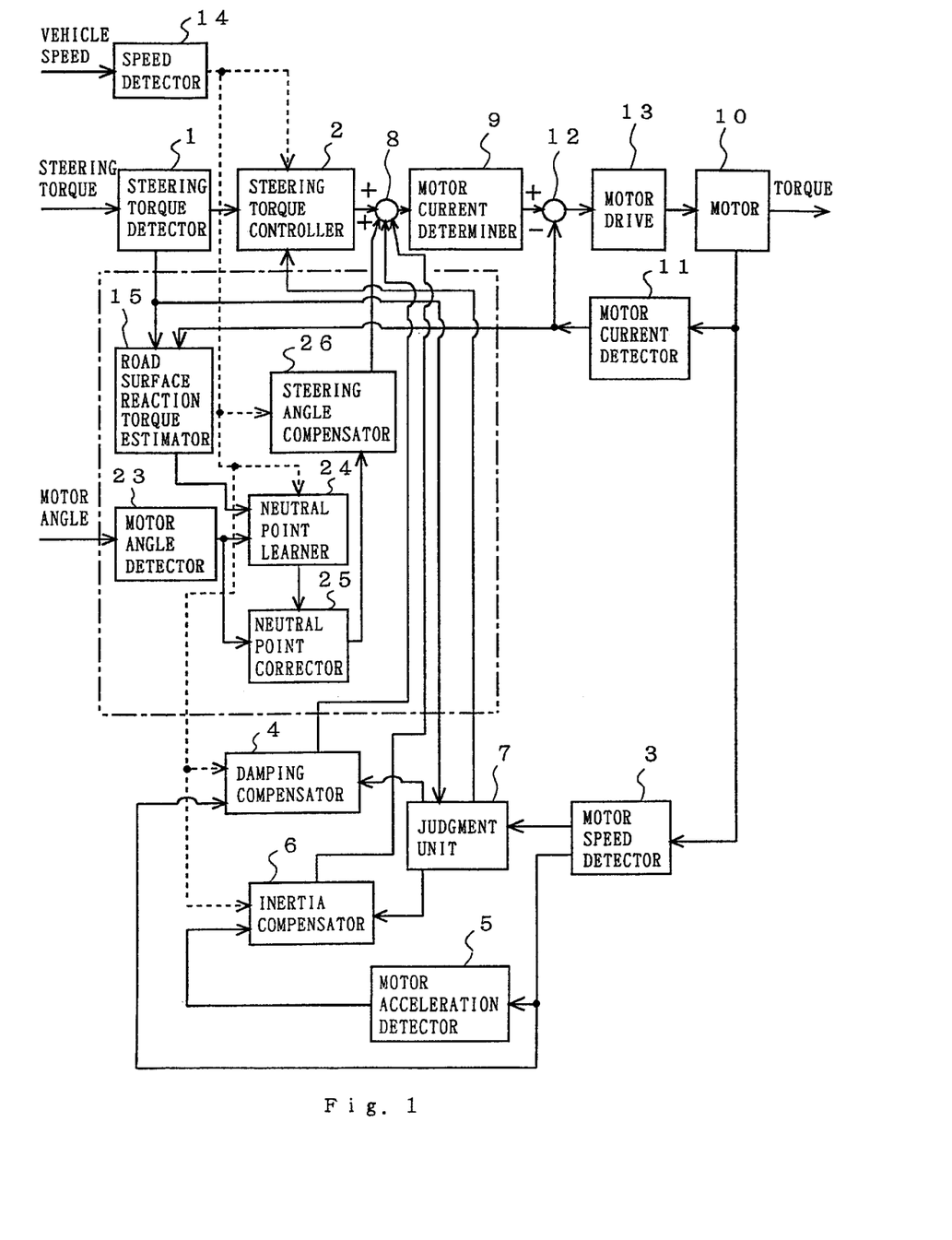
FIG. 1 is a block diagram showing a construction of an electric power steering control system according to Embodiment 1 of the present invention.

FIG. 1 is a block diagram showing an electric power steering control system according to Embodiment 1 of the present invention.

In FIG. 1, reference numeral 1 is a steering torque detector (means for detecting steering torque) for detecting a steering torque (Tsens) applied to the steering wheel when the driver manipulates the steering wheel. Numeral 2 is a steering torque controller for computing an assisting torque signal to be given by a motor on the basis of an output of the steering torque detector 1. Numeral 3 is a motor speed detector (rotating speed detecting means) for detecting a motor speed and also detecting a rotating direction thereof (rotating direction detecting means) at the same time. Numeral 4 is a damping compensator for computing a damping compensation signal on the basis of the motor speed detected by the motor speed detector 3. Numeral is a motor acceleration detector for detecting a motor acceleration using an output of the motor speed detector 3. Numeral 6 is an inertia compensator for computing an inertia compensation signal on the basis of the motor acceleration detected by the motor acceleration detector 5.

Numeral 7 is a judgment unit for judging whether or not the direction of the output of the steering torque detector 1 and that of the output of the motor speed detector 3 are the same. This judgment unit 7 outputs the result of judgment to each of the steering torque controller 2, the damping compensator 4, and the inertia compensator 6.

Numeral 8 is a first adder for computing the sum (target torque) of the assisting torque signals outputted by the damping compensator 4, the inertia compensator 6 and the steering torque controller 2, and the output signal of a steering angle compensator 26. Numeral 9 is a motor current determiner (motor current setting means) for computing a target current signal from the target torque computed by the first adder 8. Numeral 10 is a motor in which a motor current value corresponding to an applied voltage is generated and an assisting torque approximately in proportion to the motor current value is generated. The assisting torque is applied to the steering wheel used for manipulating the running wheels of the vehicle. Numeral 11 is a motor current detector (motor current detecting means) for detecting the current value (I) of the motor 10.

Numeral 12 is a second adder for obtaining a difference between the target current signal outputted by the motor current determiner 9 and the motor current value detected by the motor current detector 11.

Numeral 13 is a motor drive for determining a voltage to be applied to the motor 10 on the basis of the difference between the target current signal computed by the motor current determiner 9 and the motor current value detected by the motor current detector 11. The determined voltage is applied to the motor 10. Numeral 14 is a speed detector (speed detecting means) for detecting a vehicle speed and outputting a signal of the detected speed to the steering torque controller 2, a neutral point learning unit 24, the damping compensator 4, the inertia compensator 6, and the steering angle compensator 26.

Numeral 15 is a road surface reaction torque estimator (road surface reaction torque estimating means) for estimating a road surface reaction torque. The road surface reaction torque functions to restore a steering angle of front wheels to a starting point, (this starting point does not indicate a mechanical central angle but indicates a balance point of rotating force of the steering wheel changing depending on the condition of the road surface and on the driving condition). That is, the road surface reaction torque return the steering wheel using the steering torque detected by the steering torque detector 1 and the motor current value detected by the motor current detector 11.

Numeral 23 is a motor angle detector (motor angle detecting means) for detecting a rotating angle of the motor, outputs a zero point of the motor angle and a present angle (hereinafter referred to as motor angle) and also detects a motor rotating angle acceleration (motor angle acceleration detecting means). Numeral 24 is a neutral point learning unit for computing a zero point (this is the neutral point and changes sometimes during driving the vehicle as described above) of the steering wheel rotation. The computation of the zero point is performed on the basis of the motor angle detected by the motor angle detector 23 and the road surface reaction torque estimated by the road surface reaction torque estimator 15, thereby learning the neutral point. Numeral 25 is a neutral point corrector (neutral point correcting means) for computing a link gear ratio with respect to the motor 10 and the steering wheel not shown using the output of the motor angle detector 23. This neutral point corrector 25 further computes a relative value of the steering angle, corrects the result of the computation using the neutral point learning unit 24, and detects an absolute value of the steering angle. The neutral point learning unit 24 and the neutral point corrector 25 are collectively referred to as neutral point learning means.

Numeral 26 is a steering angle compensator (steering angle compensating means) for computing a steering angle compensation signal (i.e., steering wheel return torque) on the basis of the absolute value of the steering angle detected by the neutral point corrector 25.

A portion surrounded with a one-dot chain line is the portion introduced according to the invention, and a portion outside the portion surrounded with the one-dot chain line is the same as in the conventional electric power steering control system shown in FIG. 9.

Concerning the operation of the electric power steering control system in FIG. 1, operation performed by the characterizing part of the invention is hereinafter described with reference to the flowchart shown in FIG. 2.

Parameters j, k, $\Delta K$ shown in the flowchart are preliminarily established to be reset to zero when the power source of the control system is switched from OFF to ON and a program stored in a ROM of the control system starts its operation. The flow in FIG. 2 is carried out at the predetermined time intervals in the flow of FIG. 10 showing the mentioned conventional art.

In step 101, the steering torque is read in and stored.

In step 102, the motor current is read in and stored.

In step 103, the road surface reaction torque estimator 15 computes a road surface reaction torque Treact based on the following Expression (1) using a steering torque signal Tsens and the motor current signal I (this is hereinafter referred to as a step of estimating a road surface reaction torque).

$$Treact = Tsens + Kt \cdot I \quad (1)$$

In this expression, Kt indicates a torque constant of the motor (steering shaft conversion).

where: the motor angle (rotating angle of the motor shaft) is read in and stored as $\theta m$ (this is called a step of detecting a motor angle).

In step 105, whether or not an absolute value of the road surface reaction torque Treact is smaller than a predetermined minute value Treact0 is judged. If the result of judgment is YES, the step proceeds to step 106. If the result of judgment is NO, the step proceeds to step 113, and a road surface reaction estimating arithmetical counter K is incremented by 1 in step 113 from K to K+1, and this processing routine is completed.

In step 106, whether or not K–K0 is larger than a predetermined value of $\Delta K$ is judged, and if the result of judgment is YES, the step proceeds to step 107. If the result of judgment is NO, the step proceeds to step 113. This step is intended to prevent that judgment of YES are made many times immediately after a judgment of YES is once made in step 105 due to noise or the like without steering to left and right at a predetermined frequency.

In step 107, if the result of judgment in step 106 is YES, K0 is reset as expressed by K0=K.

In step 108, the motor angle $\theta m$ is stored as a displacement $\Delta \theta m(j)$ from the neutral point at the jth time.

In step 109, a neutral point learning counter j is incremented by 1 from j to j+1.

In step 110, whether or not the neutral point learning counter j is equal to 2 is judged. If the result of judgment is YES, it is judged that steering was carried out in such a manner that the steering wheel is turned to left and right passing the neutral point two times, and the step proceeds to step 111. If the result of judgment is NO, the step proceeds to step S113.

In step 111, displacement of the motor angle from the neutral point in the case of passing the neutral point two times is computed by arithmetic averaging, and the result of computation is stored as a neutral point learned value $\theta m$ (0) (this is hereinafter referred to as a step of learning a neutral point). The step proceeds to step 112, and the neutral point learning counter j is reset to zero in step 112.

Steps 109 to 112 are carried out by the neutral point learning unit 24.

In step 113, the road surface reaction estimating arithmetical counter K is incremented by 1 (from K to K+1), and this processing routine is finished.

The neutral point correcting quantity detected in this processing routine is established as a neutral point offset value $\theta m$(offset).

Using the neutral point corrector 25, after obtaining a result of subtracting $\theta$moffset from the motor angle $\theta m$, conversion of a link gear rate from the motor to a steering column shaft is further carried out, thus a steering wheel angle $\theta s$ is obtained (this is hereinafter referred to as a step of correcting a neutral point). Then, a proportional-differential-integral controlled variable is computed on the basis of a difference between the $\theta s$ and a target steering angle $\theta s0$ (this is the learned neutral point$\theta m0$, and in most cases the target is 0° because the target is to return the steering wheel to the original point). The controlled variable is added to a fundamental steering torque controlled variable as the steering wheel return torque (this is hereinafter referred to as a step of compensating a steering angle). On the basis of the obtained result, a target motor current value is determined, and the electric current is controlled so that the motor current may coincide to the target value.

It is also possible to obtain a similar result when the foregoing step of obtaining the steering wheel angle $\theta s$ is omitted and the return torque is directly obtained from the difference between the motor angle $\theta m$ and the neutral point learned value $\theta m$ (0). In this embodiment, the neutral point learning counter j is immediately reset to zero when the neutral point learning counter j indicates 2 in steps 110 to 112. However, it is also preferable to reset the neutral point learning counter j when it indicates a numeral larger than 2. For example, it is also preferable that an arithmetic average of the displacement $\Delta \theta m$ from the neutral point is continuously obtained until the neutral point learning counter j indicates 100. It is also preferable to use a moving average in 100 times of the displacement $\Delta \theta m$ from the latest neutral point instead of carrying out the arithmetic averaging.

Described below is the reason why it is possible to detect the road surface reaction torque from the foregoing Expression (1).

An equation of motion of the steering mechanism can be shown in the following Expression (3).

$$J \times d\omega s/dt = Thd1 + Tmtr - Tfric \cdot sign(\omega s) - Treact \quad (3)$$

where:

d$\omega$s/dt: rotating acceleration of steering wheel shaft

Thd1: steering torque

Tmtr: motor output torque (steering wheel shaft conversion)

Tfric: friction torque in the steering mechanism

Treact: road surface reaction torque (steering wheel shaft conversion)

As a result of solving Expression (3) for the road surface reaction torque Treact, a following Expression (4) is obtained.

$$Treact = Thd1 + Tmtr - J \times d\omega s/dt - Tfric \cdot sign(\omega s) \quad (4)$$

Accordingly, it is possible to compute the road surface reaction Treact from the steering torque, motor output torque, steering wheel shaft rotation acceleration, and friction torque in the steering mechanism.

It is possible to substitute the steering torque signal Tsens for the steering torque Thd1.

It is possible to substitute a value obtained by multiplying the motor current detection signal I by the torque constant for the motor output torque Tmtr.

It is possible to substitute a motor acceleration signal d ω for the steering wheel shaft rotation acceleration, and the value of this term is so small that can be ignored in general unless an extremely sharp steering is conducted.

The influence Tfric of the friction torque in the steering mechanism in left steering and that in right steering are approximately the same in intensity and opposite in direction. It is therefore possible to cancel the influence of the friction torque Tfric by computing the displacement of the motor angle from the neutral point through arithmetic averaging when the steering wheel is turned left and right and by storing the result of the computation as the neutral point learned value θm0.

Figure 3:
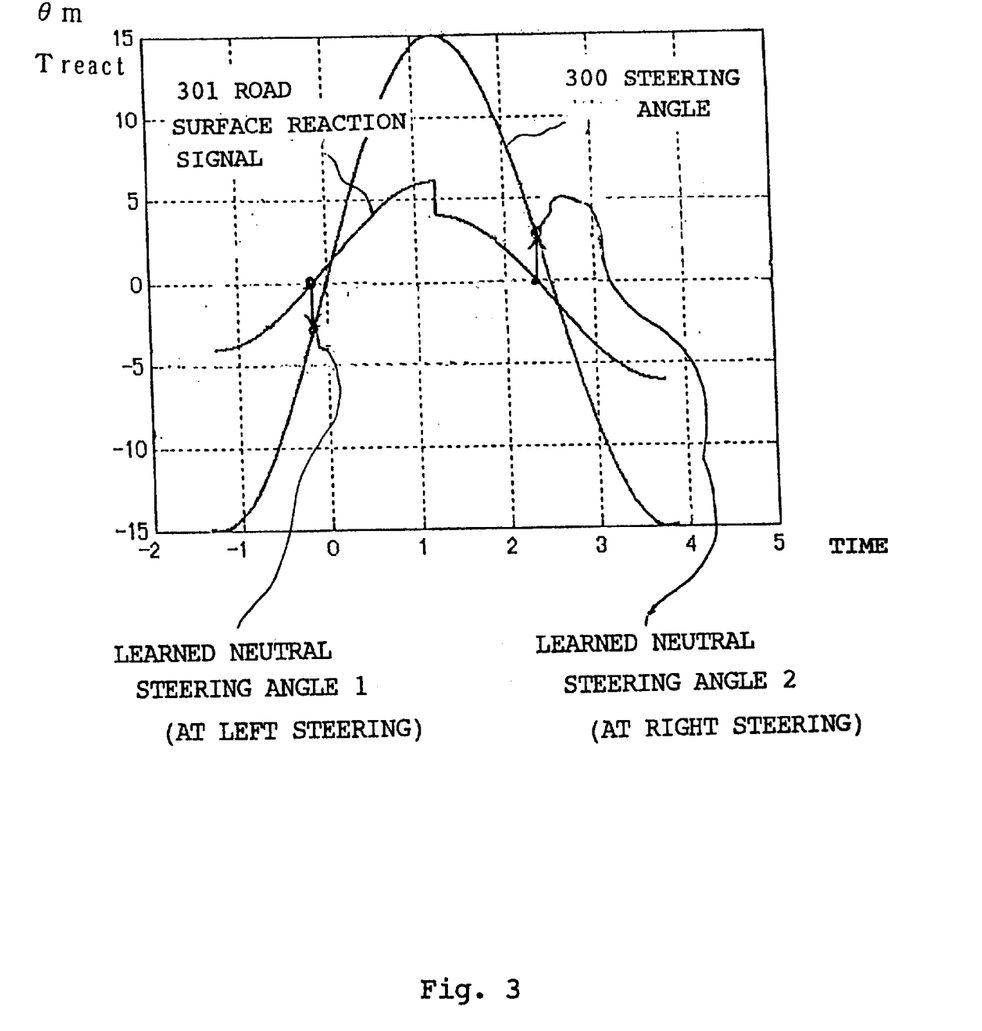
FIG. 3 is a graph explaining the operation in FIG. 1.

For better understanding, FIG. 3 shows how the road surface reaction torque changes when the steering wheel is turned left and right. The axis of abscissas in FIG. 3 indicates a time axis, and this axis does not indicate a specific time but simply indicates a flow of time during the turning of the steering wheel by the driver. The axis of ordinates indicates a steering angle (300) and an intensity of road surface reaction torque (301).

The road surface reaction in the drawing is a road surface reaction estimated in the foregoing Expression (1). The zero point of the road surface reaction is not coincident to the zero point of the steering angle due to influence of the friction torque. However, it is possible to cancel the influence of the friction torque by arithmetically averaging a neutral steering angle 1 (shown in the drawing) learned at the road surface reaction zero point in left steering and a neutral steering angle 2 (shown in the drawing) learned at the road surface reaction zero point in right steering and using the obtained result as a neutral learned value. As a result, it is possible to learn the steering angle neutral point on the basis of the road surface reaction torque detected in the foregoing Expression (1).

Embodiment 2

An electric power steering control system according to Embodiment 2 of the invention has the same construction as the system in FIG. 1, but has a different processing flow.

Figure 2:
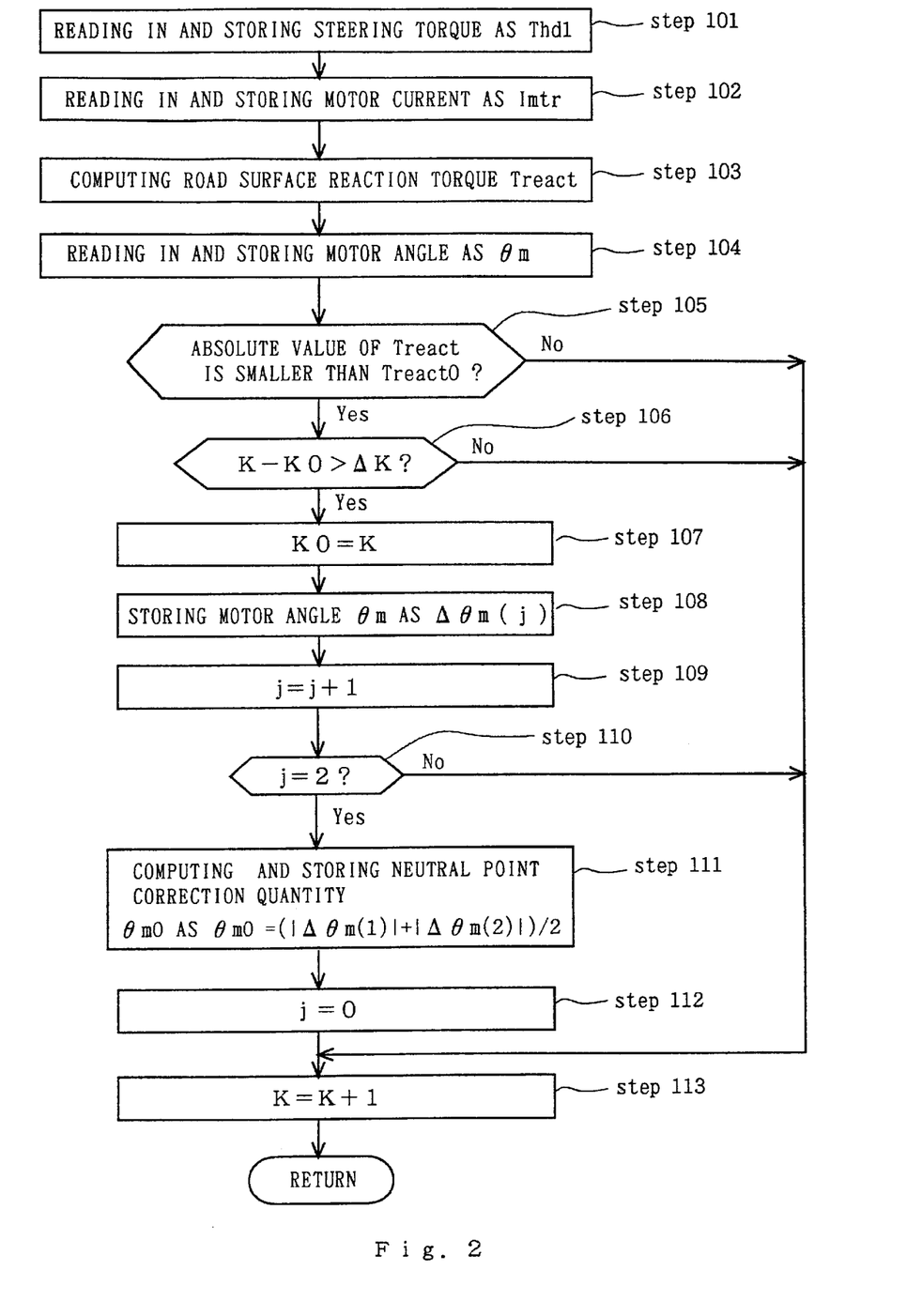
FIG. 2 is a flowchart explaining operation of the electric power steering control system in FIG. 1.

The vehicle speed is not taken into consideration when the neutral point is learned in the flowchart in FIG. 2 in the foregoing Embodiment 1. But the flow in Embodiment 2 takes the vehicle speed into consideration as shown in the flowchart of FIG. 4.

Figure 4:
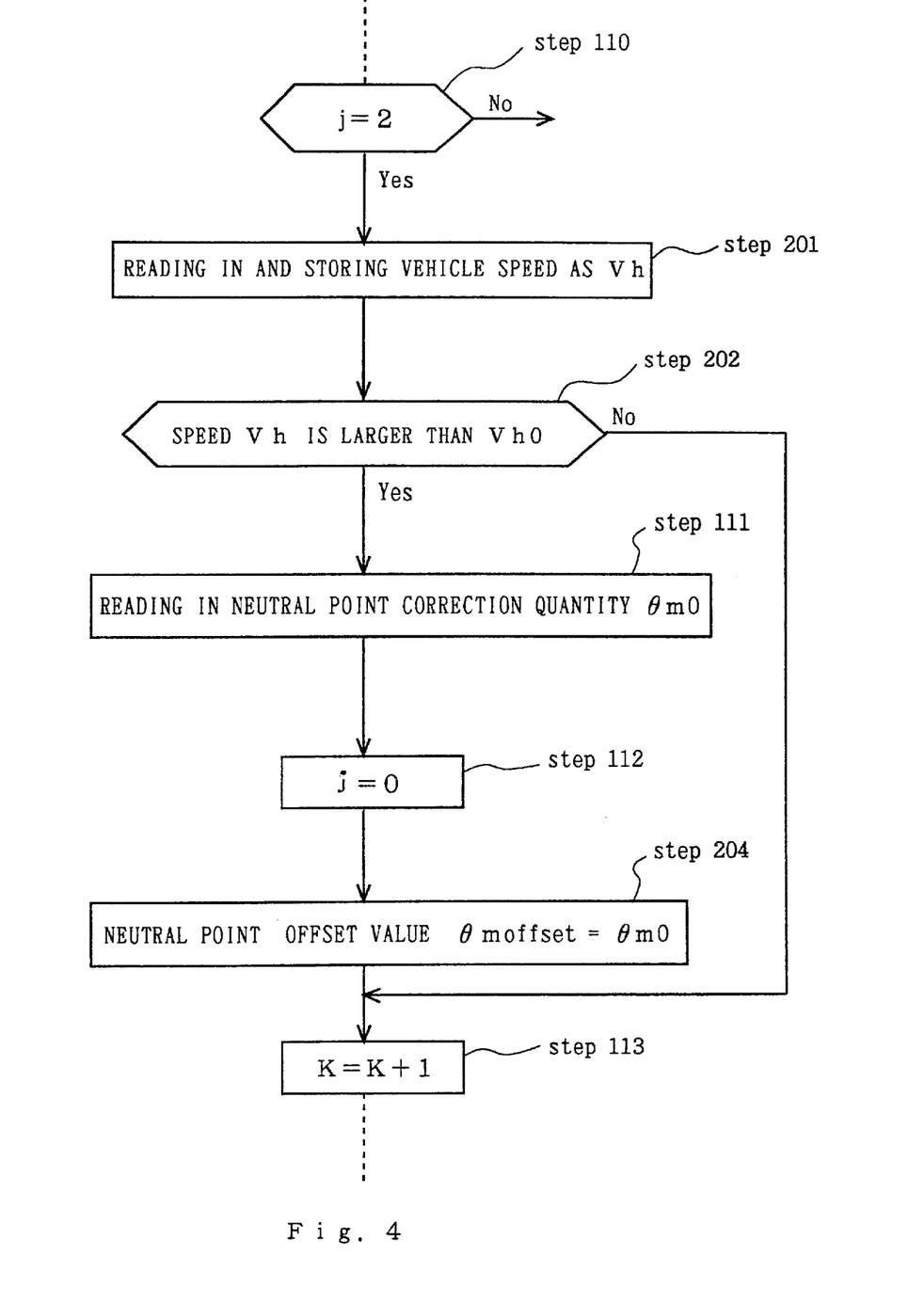
FIG. 4 is a flowchart explaining operation of an electric power steering control system according to Embodiment 2 of the invention.

That is, the flow in FIG. 4 is carried out before the neutral point is learned (for example, between steps 110 and 111) with reference to the flow in FIG. 2 of the foregoing Embodiment 1.

More specifically, in step 201, an average speed is read in at first (this is hereinafter referred to as a step of detecting a vehicle speed). If it is judged in step 202 that the vehicle speed is not lower than a predetermined value, the neutral point correcting quantity θm0 is read-in in step 203, and the neutral point offset value θmoffset is established to be θmoffset=θm0 in step 204.

If it is judged in step 202 that the vehicle speed is lower than the predetermined value, this processing routine is closed without changing the neutral point offset value θmoffset.

The θmoffset is preliminarily established to be reset to an initial value when the power source of the control system is switched on and the program stored in the ROM in the control system starts its operation. This processing routine is carried out at predetermined time intervals in the main routine, description of which is omitted.

Computation accuracy is prevented from lowering by carrying out the foregoing process and not using the neutral point offset value as θmoffset when the neutral point offset value is learned under the conditions that the road surface reaction force is small and the computation cannot be carried out with accuracy.

Figure 5:
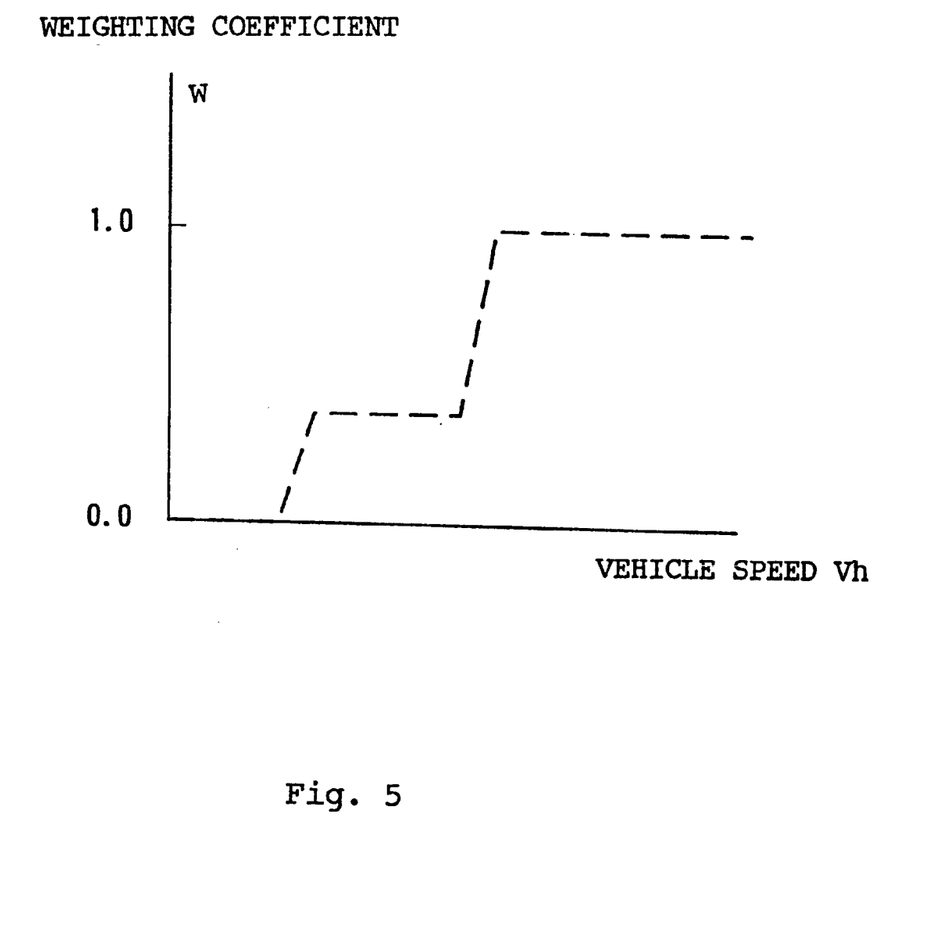
FIG. 5 is a characteristic diagram showing the relation between speed of the vehicle and a learning weighting coefficient in the flowchart in FIG. 4.

In the description of this embodiment, the system is constructed so that only the neutral point correcting quantity θm0 learned when the vehicle speed is higher than a predetermined value may be used. It is also preferable that a weighting coefficient W to be learned corresponding to the vehicle speed is predetermined and stored in a memory of the control system. Then the current neutral point correcting quantity θm01 and the previous neutral point correcting quantity θm02 are established to be an expression of θmoffset=(1−W)·θm02 +W·θm01, and the learning weight coefficient W is established to be increased as the vehicle speed increases as shown in FIG. 5. Thus, it is established that the result of the neutral point learned under the condition that the vehicle is driven at a low speed may be hardly reflected. The weight coefficient W herein is $0 \leq W \leq 1$.

Embodiment 3

Figure 6:
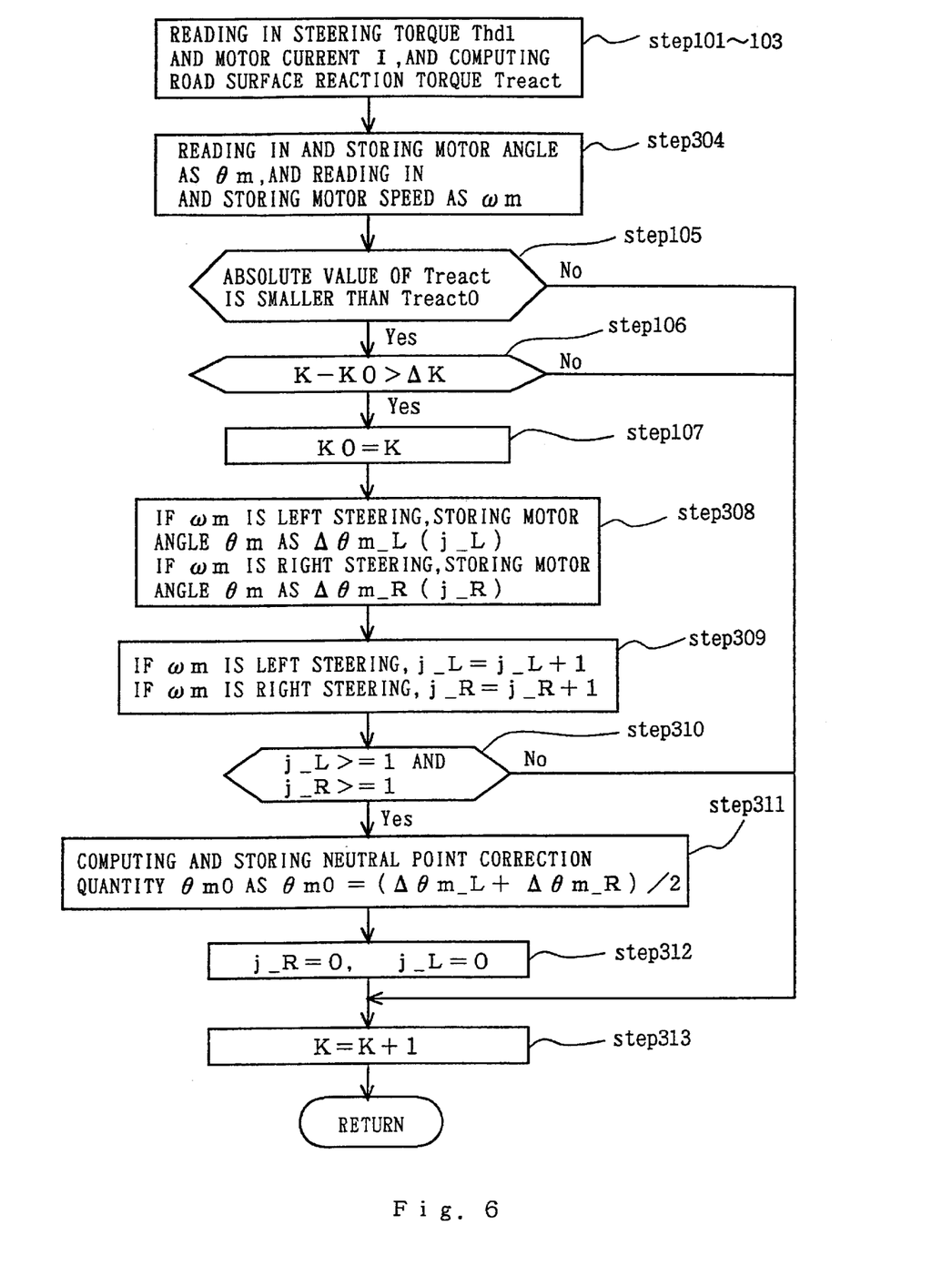
FIG. 6 is a flowchart explaining operation of an electric power steering control system according to Embodiment 3 of the invention.

In the foregoing Embodiment 1, when the neutral point learning counter j indicates 2, it is judged that left and right steering is performed, and the average of Δθm(j) is obtained. It is also preferable to take a process shown in the flow of FIG. 6. Steps 101, 102, 103, 105, 106, and 107 in FIG. 6 are the same as the steps of the same numerals in FIG. 2, and further description thereof is omitted herein. In step 304, a rotating speed signal of the motor is read in, and the steering direction is recognized on the basis of the code of the rotating speed signal of the motor (this is hereinafter referred to as a step of detecting the rotating direction). In step 308, a displacement Δθm_L from the neutral point in left steering and a displacement Δθm_R from the neutral point in right steering are distinguished according to the steering direction and stored. In step 309, a left steering counter and a right steering counter are incremented according to the respective steering directions. If both of them comes to not less than 1 in step 310, the step proceeds to step 311, and a value obtained by computing (Δθm_L+Δθm_R)/2 on the basis of the displacement Δθm_L from the neutral point in left steering and on the basis of the displacement Δθm_R from the neutral point in right steering is used as the neutral point offset value θmoffset (this is hereinafter referred to as a second step of correcting the neutral point).

In this embodiment, the neutral point learning counter is reset to zero when both of the neutral point learning counters j_L and j_R come to not less than 1. It is also preferable that the counter is reset to zero when both of the counters come to not less than 100, for example. In this case, in step 310, a value obtained by computing (Δθm_L_ave+Δθm_R_ave)/2 on the basis of an arithmetic average Δθm_L_ave of the displacement Δθm_L from the neutral point in left steering and on the basis of an arithmetic average Δθm_R_ave of the displacementΔθm_R from the neutral point in right steering is used as the neutral point offset value θmoffset.

Embodiment 4

In general, it is preferable to construct a steering mechanism so that steering in bilateral symmetry may be secured when the steering wheel is turned left and right. However, the steering wheel is not positioned in the middle of the width direction of the vehicle in most cases, and therefore the structure thereof is bilaterally asymmetrical. As a result, in some operation area subject to an influence of nonlinear element due to friction or the like, bilaterally symmetrical steering is not secured in some cases. In order to cope with this problem, it is preferable to carry out the process of subtracting the friction torque of the steering left and right as the offset quantity from the road surface reaction torque estimated by the road surface reaction torque estimating means in step 103 in FIG. 2 and learn the neutral point on the basis of this result. The following expression is used in this process.

$$Treact = Tsens + Kt \cdot I - Tfric \cdot sign(\omega) \quad (2)$$

where: sign(ω) is a code of the motor speed ω. According to this code, the friction torque Tfric stored in the ROM (not shown) in the control system is looked up from a table stored in advance in the system.

Embodiment 5

Under actual driving conditions, in specific driving pattern such as changing lane, the steering wheel is turned left and right and the neutral point is learned more accurately in a certain steering pattern. Steering speed and steering acceleration in such a specific driving pattern remain within a predetermined range in many cases. In this Embodiment 5, for the purpose of reducing learning frequency except the steering pattern in which the neutral point can be learned with accuracy, the rotating angle detecting means for detecting a rotating angle of a motor is inputted to the neutral point learning means for learning a neutral point of the steering angle. And the neutral point is learned when the steering speed and the steering acceleration remain within a predetermined range. Alternatively, referring to FIG. 2, it is also preferable that the rotating angle of the motor is read in and the motor speed and its acceleration are computed in step 104. And whether or not the motor speed and acceleration are in a predetermined range is judged at the same time when intensity of the absolute value of the road surface reaction torque is judged in step 105.

Embodiment 6

Figure 7:
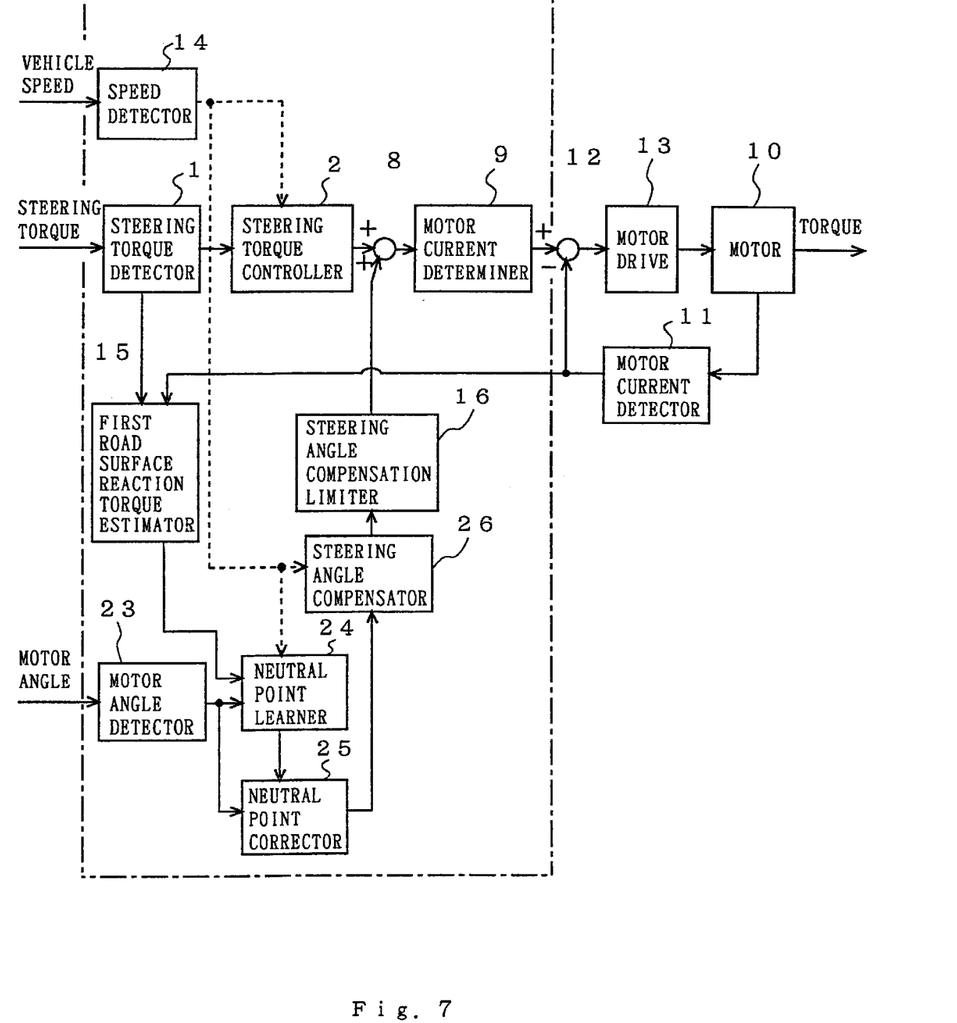
FIG. 7 is a block diagram showing a construction of an electric power steering control system according to Embodiment 6 of the invention.

In the foregoing Embodiments 1 to 5, it is preferable that the torque generated by the steering angle compensator 26 does not exceed a predetermined value even when the neutral point learning unit 24 learns erroneously the neutral point so that the driver may easily recover the neutral point. For that purpose, it is preferred that an output limiter 16 is provided in the latter stage of the steering angle compensator 26. As a result of this, the output of the steering angle compensator 26 shown in FIG. 7 does not exceed a predetermined value, and it is possible to prevent a dangerous driving situation in the case of malfunction.

Embodiment 7

Figure 8:
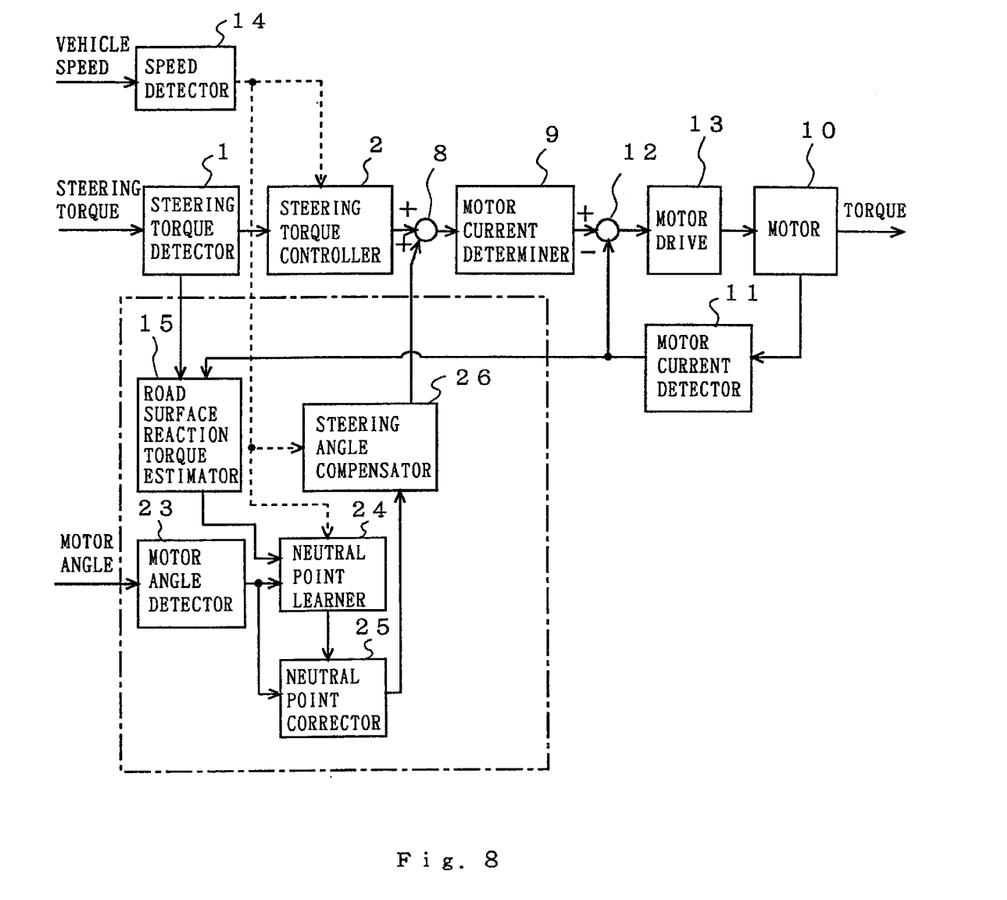
FIG. 8 is a block diagram showing a construction of an electric power steering control system according to Embodiment 7 of the invention.

In the construction of FIG. 1 showing Embodiment 1, the damping compensator 4, the inertia compensator 6, the judgment unit 7, the motor acceleration detector 5, and the motor speed detector 3 have been conventionally used as described in the drawing explaining the conventional example referring to FIG. 10. These elements are not always required in the constructions according to the foregoing Embodiments 1 to 6. FIG. 8 shows a construction without them. Operation referring to FIG. 8 is the same as that of the flow in FIG. 2 showing the foregoing Embodiment 1, and further description thereof is omitted herein.

What is claimed is:

1. An electric power steering control system comprising:

a motor for applying an assisting torque to a steering wheel for manipulating running wheels of a vehicle;

steering torque detecting means for detecting a torque applied to the steering wheel by a driver of the vehicle as a steering torque;

motor angle detecting means for detecting a rotating angle of said motor;

road surface reaction torque estimating means for estimating a road surface reaction torque of the running wheels using the steering torque; and neutral point learning means for learning a neutral point of the steering wheel under actual driving conditions from the road surface reaction torque estimated and the rotating angle of said motor.

2. The electric power steering control system according to claim 1 further comprising:

steering angle compensation means for computing a return torque to return the steering wheel to the neutral point from a difference between the rotating angle of said motor and the learned neutral point and for converting the return torque into an electric current of said motor, whereby the return torque is applied to the steering wheel whenever the steering wheel is turned from the neutral point.

3. The electric power steering control system according to claim 1 further comprising:

speed detecting means for detecting speed of the vehicle; and means for stopping operation of said neutral point learning means when the vehicle speed detected by said speed detecting means is smaller than a threshold speed.

4. The electric power steering control system according to claim 3 further comprising rotating direction detecting means for outputting different codes according to the rotating direction of said motor, wherein said neutral point learning means learns a neutral point in left steering and a neutral point in right steering, respectively, according to the codes output by said rotating direction detecting means and subsequently learns a neutral point by computing an average of the neutral point in left steering and the neutral point in right steering.

5. The electric power steering control system according to claim 3 further comprising rotating direction detecting means for outputting different codes according to the rotating direction of said motor, wherein said neutral point learning means learns a neutral point based on a value obtained by subtracting or adding a preliminarily stored friction torque of a steering mechanism according to the rotating direction from or to the road surface reaction torque estimated.

6. The electric power steering control system according to claim 5 further comprising one of rotating speed detecting means for detecting a rotating speed of said motor and angular acceleration detecting means for detecting a rotating angular acceleration of said motor, wherein said neutral point learning means learns a neutral point when at least one of the rotating speed and the rotating angular acceleration of said motor is smaller than a predetermined value and does not learn the neutral point when the rotating speed and the rotating angular acceleration of the motor are larger than the predetermined value.

7. The electric power steering control system according to claim 2, wherein said steering angle compensating means comprises a limiter for limiting an output of said steering angle compensating means to within a range.

8. The electric power steering control system according to claim 6 further comprising:
   a damping compensator for compensating damping based on the speed of said motor; and
   an inertia compensator for compensating inertia based on the acceleration of said motor, wherein said damping compensator and said inertia compensator work when the vehicle speed exceeds the threshold speed, and said damping compensator and said inertia compensator stop working when the vehicle speed does not exceed the threshold speed.

9. An electric power steering control system comprising:
   a motor for applying an assisting torque to a steering wheel for manipulating running wheels of a vehicle;
   steering torque detecting means for detecting a torque applied to the steering wheel by a driver of said vehicle as a steering torque;
   motor angle detecting means for detecting a rotating angle of said motor;
   motor current setting means for setting a target value of an electric current flowing in said motor in response to a torque command signal;
   motor current detecting means for detecting the electric current flowing in said motor;
   road surface reaction torque estimating means for estimating a road surface reaction torque of the running wheels using the steering torque and the current of said motor;
   neutral point learning means for learning a neutral point of the steering wheel under current driving conditions from road surface reaction torque estimated and the rotating angle of said motor; and
   steering angle compensation means for computing a return torque to return the steering wheel to the neutral point from a difference between the rotating angle of said motor and the learned neutral point and outputting the return torque to said motor current setting means, whereby the return torque is applied to the steering wheel whenever the steering wheel is turned from the neutral point.

10. The electric power steering control system according to claim 9 further comprising:
    speed detecting means for detecting speed of the vehicle; and
    means for stopping operation of said neutral point learning means when the vehicle speed detected by said speed detecting means is smaller than a threshold speed.

11. The electric power steering control system according to claim 10 further comprising rotating direction detecting means for outputting different codes according to the rotating direction of said motor, wherein said neutral point learning means learns a neutral point in left steering and a neutral point in right steering, respectively, according to the codes output by said rotating direction detecting means and subsequently learns a neutral point by computing an average of the neutral point in left steering and the neutral point in right steering.

12. The electric power steering control system according to claim 10 further comprising rotating direction detecting means for outputting different codes according to the rotating direction of said motor, wherein said neutral point learning means learns a neutral point based on a value obtained by subtracting or adding a preliminarily stored friction torque of a steering mechanism according to the rotating direction from or to the road surface reaction torque estimated.

13. The electric power steering control system according to claim 12 further comprising one of rotating speed detecting means for detecting a rotating speed of said motor and angular acceleration detecting means for detecting a rotating angular acceleration of said motor, wherein said neutral point learning means learns a neutral point when at least one of the rotating speed and the rotating angular acceleration of said motor is smaller than a predetermined value and does not learn the neutral point when the rotating speed and the rotating angular acceleration of the motor are larger than the predetermined value.

14. The electric power steering control system according to claim 12, wherein said steering angle compensating means comprises a limiter for limiting an output of said steering angle compensating means to within a range.

15. The electric power steering control system according to claim 13 further comprising:
    a damping compensator for compensating damping based on the speed of said motor; and
    an inertia compensator for compensating inertia based on the acceleration of said motor, wherein said damping compensator and said inertia compensator work when the vehicle speed exceeds a threshold speed, and said damping compensator and said inertia compensator stop working when the vehicle speed does not exceed the threshold speed.

16. A method for controlling an electric power steering control system including:
    detecting a rotating angle of a motor for applying an assisting torque to a steering wheel for manipulating running wheels of a vehicle;
    estimating a road surface reaction torque using a steering torque applied to the steering wheel by a driver of the vehicle and a current signal of the motor;
    learning a neutral point of the steering wheel from the road surface reaction torque and the rotating angle of the motor; and
    compensating a steering angle in which a torque for returning the steering wheel to the neutral point is computed from the neutral point and the rotating angle of the motor.

17. The method for controlling an electric power steering control system according to claim 16 further including:
    detecting vehicle speed; and
    stopping learning the neutral point when the vehicle speed is lower than a predetermined speed.

18. The method for controlling an electric power steering control system according to claim 16 further including:
    detecting a rotating direction in which different codes are output according to the rotating direction of the motor; and
    learning a neutral point in left steering and a neutral point in right steering, respectively, according to the codes of the rotating direction output at the time of learning the neutral point and subsequently computing an average of the neutral point in left steering and the neutral point in right steering.

* * * * *